(12) United States Patent
Liu et al.

(10) Patent No.: US 10,261,383 B2
(45) Date of Patent: Apr. 16, 2019

(54) ELECTRONIC PAPER TOUCH PANEL, ITS CONTROLLING METHOD, AND DISPLAY DEVICE

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Tingliang Liu, Beijing (CN); Yue Long, Beijing (CN); Weiyun Huang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 6 days.

(21) Appl. No.: 15/502,520

(22) PCT Filed: Aug. 24, 2016

(86) PCT No.: PCT/CN2016/096463
§ 371 (c)(1),
(2) Date: Feb. 8, 2017

(87) PCT Pub. No.: WO2017/059748
PCT Pub. Date: Apr. 13, 2017

(65) Prior Publication Data
US 2018/0210309 A1     Jul. 26, 2018

(30) Foreign Application Priority Data
Oct. 9, 2015 (CN) .......................... 2015 1 0649664

(51) Int. Cl.
*G02F 1/167* (2006.01)
*G06F 3/044* (2006.01)
(Continued)

(52) U.S. Cl.
CPC .......... *G02F 1/167* (2013.01); *G02F 1/13338* (2013.01); *G02F 1/13439* (2013.01);
(Continued)

(58) Field of Classification Search
None
See application file for complete search history.

(56) References Cited

U.S. PATENT DOCUMENTS

2012/0026101 A1    2/2012   Lee et al.
2013/0271391 A1   10/2013   Tu et al.
(Continued)

FOREIGN PATENT DOCUMENTS

CN     103376962 A    10/2013
CN     104281344 A     1/2015
(Continued)

OTHER PUBLICATIONS

First Office Action for Chinese Application No. 201510649664.5, dated Jul. 26, 2017, 7 Pages.
(Continued)

*Primary Examiner* — Kenneth B Lee, Jr.
(74) *Attorney, Agent, or Firm* — Brooks Kushman P.C.

(57) ABSTRACT

The present disclosure provides an electronic paper touch panel, its controlling method and a display device. The electronic paper touch panel includes a first substrate where a first electrode layer is formed, a second substrate where a second electrode layer is formed, and an electronic ink layer arranged between the first electrode layer and the second electrode layer. The second electrode layer on the second substrate includes a plurality of electrode units arranged (Continued)

separate from each other, and each electrode unit is connected to a signal line. The signal line is configured to input a touch signal to each electrode unit at a touch time period, and input a display signal to each electrode unit at a display time period.

18 Claims, 2 Drawing Sheets

(51) Int. Cl.
    *G02F 1/1333*     (2006.01)
    *G02F 1/1343*     (2006.01)
    *G06F 3/041*     (2006.01)

(52) U.S. Cl.
    CPC .. *G02F 1/133305* (2013.01); *G02F 1/134309* (2013.01); *G06F 3/044* (2013.01); *G06F 3/0412* (2013.01); *G06F 3/0416* (2013.01); *G02F 2001/1672* (2013.01); *G02F 2001/1676* (2013.01); *G02F 2201/121* (2013.01)

(56) References Cited

U.S. PATENT DOCUMENTS

| | | | |
|---|---|---|---|
| 2015/0009170 A1* | 1/2015 | Chen | G06F 3/044 |
| | | | 345/174 |
| 2016/0284732 A1 | 9/2016 | Wei et al. | |
| 2016/0291751 A1 | 10/2016 | Ma et al. | |

FOREIGN PATENT DOCUMENTS

| CN | 104698698 A | 6/2015 |
|---|---|---|
| CN | 104749843 A | 7/2015 |
| CN | 105183260 A | 12/2015 |
| CN | 204965398 U | 1/2016 |

OTHER PUBLICATIONS

International Search Report and Written Opinion for Application No. PCT/CN2016/096463, dated Oct. 28, 2016, 10 Pages.
Second Office Action for Chinese Application No. 201510649664.5, dated Jan. 25, 2018, 7 Pages.

\* cited by examiner

ELECTRONIC PAPER TOUCH PANEL, ITS CONTROLLING METHOD, AND DISPLAY DEVICE

CROSS-REFERENCE TO RELATED APPLICATIONS

This application is the U.S. national phase of PCT Application No. PCT/CN2016/096463 filed on Aug. 24, 2016, which claims priority to Chinese Patent Application No. 201510649664.5 filed on Oct. 9, 2015, the disclosures of which are incorporated in their entirety by reference herein.

TECHNICAL FIELD

The present disclosure relates to the field of display technology, in particular to an electronic paper touch panel, its controlling method and a display device.

BACKGROUND

Electronic paper has been widely used due to such features as low power consumption, low manufacture cost, being capable of achieving flexible display and being conform to people's reading habit, and such advantages as being portable, large memory space and being environmentally-friend as compared with paper. Along with the rapid development of smart phones and smart wearable devices, the touch experience is highly demanded. Currently, an electronic paper touch panel is mainly connected externally, and it has high power consumption. As a result, a thickness of the touch panel may increase, and there is no cost advantage.

For an electronic paper display device, usually an electronic stylus is used as an input device. At a tail of the electronic stylus, a wire is connected to the electronic paper, so the writing is very inconvenient. In addition, during the writing, a tip of the electronic stylus may be in contact with the electronic paper, so the electronic paper may easily be scratched. Further, in the case a touch panel is adopted, such a defect as pincushion distortion may easily occur. The electronic paper is relatively thick, so the light transmittance of the electronic paper display device may be adversely affected.

SUMMARY

An object of the present disclosure is to provide an electronic paper touch panel, its controlling method and a display device, so as to simplify the manufacture thereof, achieve a thin and light product, and improve the light transmittance.

In one aspect, the present disclosure provides in some embodiments an electronic paper touch panel, including a first substrate where a first electrode layer is formed, a second substrate where a second electrode layer is formed, and an electronic ink layer arranged between the first electrode layer and the second electrode layer. The second electrode layer on the second substrate includes a plurality of electrode units arranged separate from each other, and each electrode unit is connected to a signal line. The signal line is configured to input a touch signal to each electrode unit at a touch time period, and input a display signal to each electrode unit at a display time period.

In a possible embodiment of the present disclosure, the second substrate includes a plurality of pixel units, and each electrode unit corresponds to at least one pixel unit.

In a possible embodiment of the present disclosure, the second electrode layer includes a plurality of electrode blocks, each electrode block corresponds to at least one pixel unit, each electrode unit includes several electrode blocks, the electrode blocks of an identical electrode unit are connected to each other, and the electrode blocks of different electrode units are arranged independent of each other.

In a possible embodiment of the present disclosure, the pixel units and the electrode blocks are arranged in a one-to-one correspondence manner.

In a possible embodiment of the present disclosure, each electrode unit includes the electrode blocks at an identical amount.

In a possible embodiment of the present disclosure, the second substrate is an array substrate.

In a possible embodiment of the present disclosure, the first substrate is a polyethylene terephthalate (PET) substrate.

In a possible embodiment of the present disclosure, microcapsules are dispersed within the electronic ink layer.

In a possible embodiment of the present disclosure, each microcapsule includes at least one type of quantum dots for displaying one color.

In a possible embodiment of the present disclosure, the electronic ink layer further includes a plurality of microcups or spinning balls.

In a possible embodiment of the present disclosure, the first electrode layer is a transparent electrode layer, the second electrode layer is a common electrode layer, and the signal line is configured to input a common electrode signal to each electrode unit at the display time period.

In another aspect, the present disclosure provides in some embodiments a method for controlling the above-mentioned electronic paper touch panel, including steps of: at a touch time period, inputting a touch signal to each electrode unit in the second electrode layer; and at a display time period, inputting a display signal to each electrode unit in the second electrode layer.

In yet another aspect, the present disclosure provides in some embodiments a display device including the above-mentioned electronic paper touch panel.

According to the embodiments of the present disclosure, the second electrode layer on the second substrate of the electronic paper touch panel is partitioned into a plurality of independent electrode units, and each electrode unit is connected to a signal line. Through time-division driving, the touch signal and the display signal are inputted to each electrode unit within different time periods, and a display electrode and a touch electrode may be multiplexed, so as to reduce a thickness of the entire product, thereby to provide a thin and light product. In addition, due to the reduction in the thickness, it is able to increase a transmission speed of light, thereby to improve the light transmittance. Further, because the display electrode and the touch electrode are multiplexed, no additional manufacture process is added, i.e., it is able to reduce the manufacture cost, and improve the user experience.

DETAILED DESCRIPTION

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
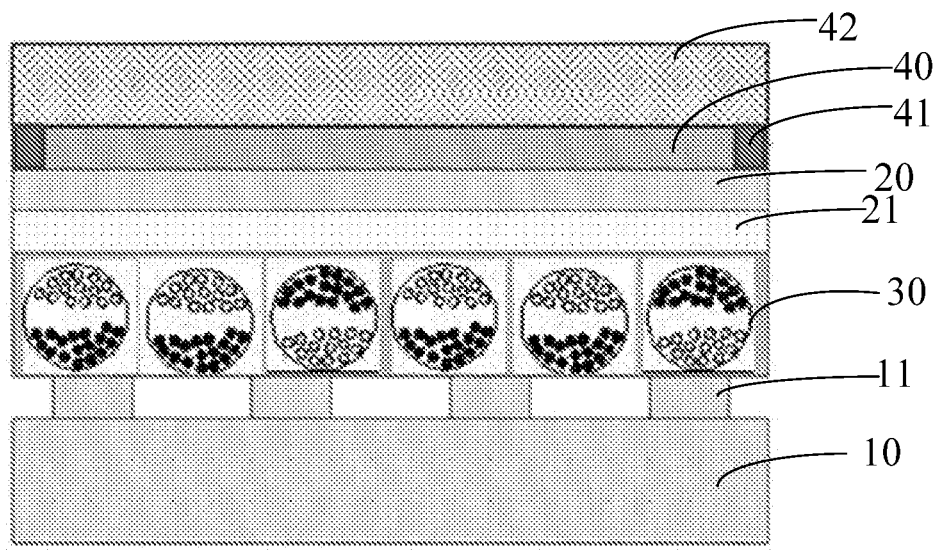
FIG. 1 is a sectional view of an electronic paper touch panel.

As shown in FIG. 1, an electronic stylus-independent technology has been proposed in the related art, where the deflection of a microcapsule 30 may be controlled by a common electrode 11 on a TFT substrate 10 and a transparent electrode 21 on an upper substrate 20, so as to display an image. An indium tin oxide (ITO) electrode 40 may be deposited on the upper substrate 20 of an electronic paper, and electrode lines 21 at four corners of the upper substrate 20 are connected to a driver integrated circuit (IC) end. In the case that a touch panel is touched by a finger, a touch position may be determined by measuring currents flowing through the four corners. As compared with an electronic stylus technology, it is able for this method to reduce a thickness of a display device, thereby to improve the user experience. However, a manufacture process thereof is relatively complex, and such a defect as pincushion distortion may easily occur for a touch result. In addition, the electronic paper is relatively thick, so the light transmittance of an electronic paper display device may be adversely affected.

In a word, in the related art, the electronic paper touch panel is relatively thick, its manufacture process is relatively complex and the light transmittance thereof may be adversely affected. The present disclosure aims to provide an electronic paper touch panel, its controlling method and a display device, so as to simplify the manufacture thereof, achieve a thin and light product, and improve the light transmittance.

Figure 3:
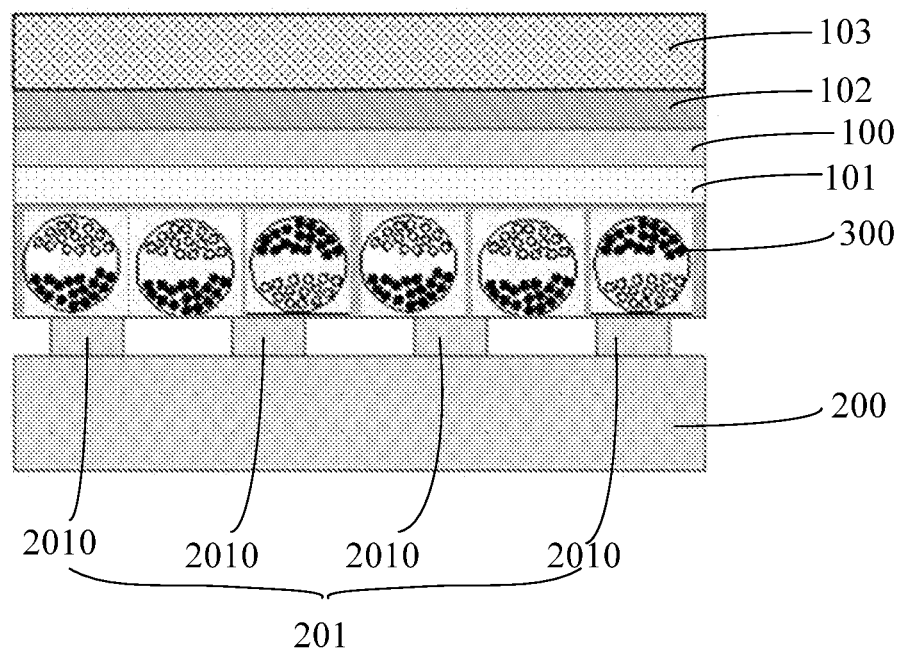
FIG. 3 is a sectional view of an electronic paper touch panel according to one embodiment of the present disclosure.
Figure 4:
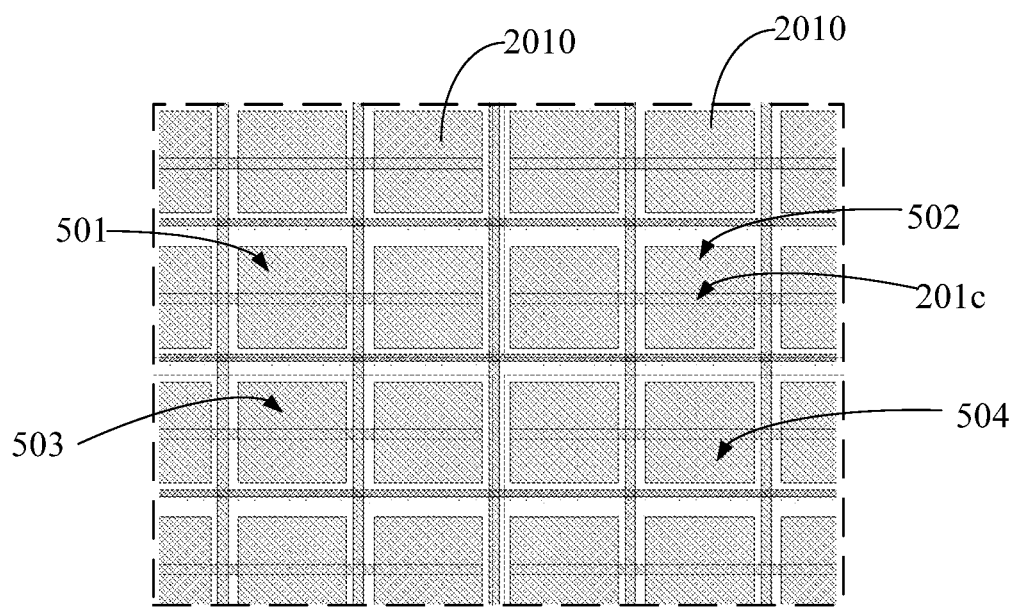
FIG. 4 is a schematic view showing pixels on a TFT substrate of the electronic paper touch panel according to one embodiment of the present disclosure.

As shown in FIGS. 3 and 4, the present disclosure provides in some embodiments an electronic paper touch panel, including a first substrate 100 where a first electrode layer 101 is formed, a second substrate 200 where a second electrode layer 201 is formed, and an electronic ink layer 300 arranged between the first electrode layer 101 and the second electrode layer 201. The second electrode layer 201 on the second substrate 200 includes a plurality of electrode units arranged separate from each other, and each electrode unit is connected to a signal line. The signal line is configured to input a touch signal to each electrode unit at a touch time period, and input a display signal to each electrode unit at a display time period.

The electronic paper touch panel in the embodiments of the present disclosure is a self-capacitive electronic paper touch panel, where a self-capacitive metal electrode for a touch function may also serve as a display electrode for a display function. Through time-division driving, the touch signal and the display signal may be applied to the metal electrode which serves as the touch electrode and the display electrode at different time periods, so as to achieve the display function and the touch function.

To be specific, for the electronic paper touch panel in the embodiments of the present disclosure, the second electrode layer 201 on the second substrate 200 may be partitioned into several electrode units independent of each other, these electrode units may be arranged on the second substrate 200 in a matrix form, and each electrode unit is connected to a signal line. In a time-division driving mode, a display signal may be inputted to each electrode unit via the signal line at the display time period so as to store charges. At the touch time period, a change in a capacitance of each electrode unit may be scanned via the signal line, so as to determine the touch position.

According to the embodiments of the present disclosure, the display electrode and the touch electrode may be multiplexed, and as compared with the structure where the display electrode and the touch electrode are arranged at different layers, it is able to reduce the thickness of the entire device, thereby to provide a thin and light product. In addition, due to the reduction in the thickness, it is able to increase a transmission speed of light, thereby to improve the light transmittance. Further, as compared with the structure where the display electrode and the touch electrode are arranged separately, the display electrode and the touch electrode may be formed in the embodiments of the present disclosure through a single patterning process, i.e., no additional manufacture process is added. As a result, it is able to reduce the manufacture cost, and improve the user experience.

In a possible embodiment of the present disclosure, the second substrate 200 includes a plurality of pixel units, and each electrode unit corresponds to at least one pixel unit.

In the embodiments of the present disclosure, each electrode unit may correspond to at least one pixel unit, e.g., each electrode unit may correspond to two or more pixel units.

In a possible embodiment of the present disclosure, as shown in FIG. 4, the second electrode layer 201 includes a plurality of electrode blocks 2010 arranged in a matrix form, and each electrode block 2010 corresponds to one pixel unit. Each electrode unit includes several electrode blocks 2010, the electrode blocks 2010 of an identical electrode unit are connected to each other, and the electrode blocks 2010 of different electrode units are arranged separate from each other.

In the embodiments of the present disclosure, as shown in FIG. 4, each pixel unit may correspond to one electrode block 2010. The electrode blocks 2010 of an identical electrode unit may be connected to each other, and the touch signal or display signal may be applied to each electrode block 2010 of the same electrode unit via a scanning line. The electrode blocks 2010 of different electrode units may be arranged separate from each other, i.e., the electrode blocks 2010 of different electrode units may be disconnected to each other. In this way, in the case that the touch signal is applied to the electrode block 2010 of each electrode unit, it is able to determine the touch position by scanning a change in the capacitance of the electrode blocks 2010 of the electrode units at different positions.

In the embodiments of the present disclosure, in the case that the display electrode and the touch electrode are multiplexed, the display electrode at a display region may be divided into several electrode units, and each electrode unit is connected to the driver IC end via a signal line. As compared with the structure where the display electrodes at the display region are connected to form a single piece, different display signals may be applied to different electrode units in the embodiments of the present disclosure according to an algorithm adopted by the driver IC end, so as to display images at different regions.

It should be appreciated that, in actual use, each electrode block 2010 may also correspond to a plurality of pixel electrodes. Here, the correspondence between each electrode 2010 and the pixel electrodes will not be particularly defined herein.

In a possible embodiment of the present disclosure, each electrode unit may include the electrode blocks 2010 at an identical amount. It should be appreciated that, the number of the electrode blocks 2010 of each electrode unit will not be particularly defined herein.

In a possible embodiment of the present disclosure, microcapsules are dispersed within the electronic ink layer 300, and each microcapsule may include at least one type of quantum dots for displaying one color. In another possible embodiment of the present disclosure, the electronic ink layer 300 may further include a plurality of microcups or spinning balls.

In a possible embodiment of the present disclosure, the first electrode layer 101 is a transparent electrode layer, and the second electrode layer 201 is a common electrode layer. The signal line is configured to input a common electrode signal to each electrode unit at the display time period. Of course, it should be appreciated that, in a special application scenario, the second electrode layer 201 may serve as a display electrode for a display function, rather than a common electrode.

As shown in FIG. 3, the electronic paper touch panel in the embodiments of the present disclosure may be an active-matrix electronic paper, where the first substrate 100 may be a PET substrate, and the second substrate 200 may be a TFT array substrate. Of course, the electronic paper touch panel may also be of any other types.

The electronic paper touch panel will be described hereinafter in more details by taking the active-matrix electronic paper as an example and comparing it with the active-matrix electronic paper in FIG. 1.

Figure 2:
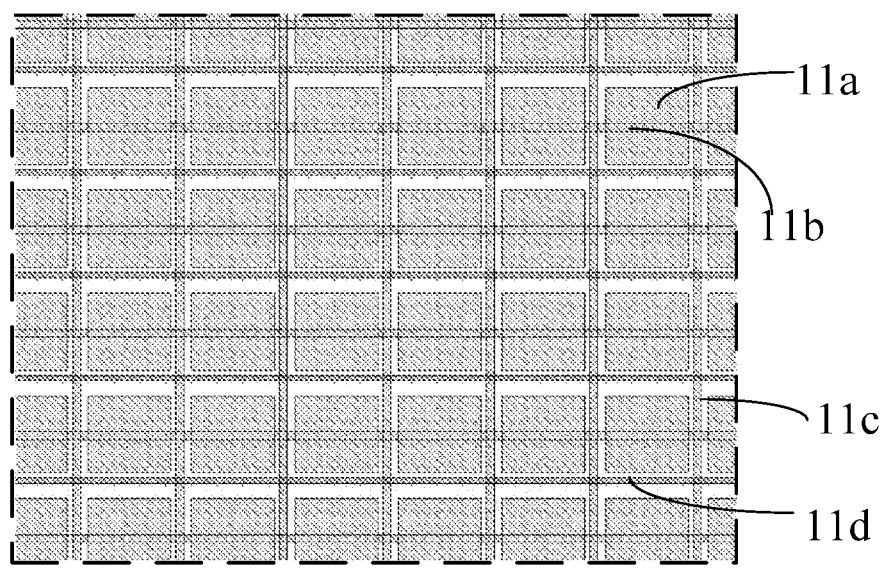
FIG. 2 is a schematic view showing pixels on a TFT substrate of the electronic paper touch panel.

FIG. 1 is a sectional view of an active-matrix electronic paper, and FIG. 2 is a schematic view showing pixels for the active-matrix electronic paper in FIG. 1. As shown in FIG. 1, the active-matrix electronic paper includes an upper substrate 20 and a lower substrate 10 arranged opposite to each other, and an electronic ink layer 30 arranged between the upper substrate 20 and the lower substrate 10. A transparent electrode layer 21, a protection layer (not shown), a touch electrode 41 and an insulating ink layer 42 are arranged on the upper substrate 20. The transparent electrode layer 21 may be an ITO layer. As shown in FIG. 2, a plurality of pixel units, a plurality of data lines 11c and a plurality of scanning lines 11d crossing the data lines 11c are arranged on the lower substrate 10. Each pixel unit corresponds to a metal electrode block 11a. The metal electrode blocks 11a corresponding to the adjacent pixel units are connected to each other via a metal line 11b, so as to form a common electrode 11. The common electrode 11 is connected to a peripheral common signal line through the metal line 11b, so that a common signal is applied to the common electrode. After a channel is turned on, the transparent electrode layer 21 on the upper substrate 20 may be charged through the pixel unit, so as to form a storage capacitor with the common electrode 11 on the lower substrate 10, thereby to achieve the display function.

In the embodiments of the present disclosure, based on the above-mentioned active-matrix electronic paper, the pixel design of the electronic paper may be optimized without any additional manufacture process, i.e., a self-capacitive touch electrode may be formed on the TFT substrate, so as to provide the thin and light electronic paper touch panel.

FIG. 3 is a sectional view of the electronic paper touch panel according to one embodiment of the present disclosure, and FIG. 4 is a schematic view showing the pixels of the electronic paper touch panel according to one embodiment of the present disclosure.

As shown in FIG. 3, in a possible embodiment of the present disclosure, the electronic paper touch panel includes the first substrate 100, the second substrate 200 arranged opposite to the first substrate 100, and the electronic ink layer 300 arranged between the first substrate 100 and the second substrate 200. The first electrode layer 101, a protection layer 102 and an insulating ink layer 303 are arranged on the first substrate 100. The first electrode layer 101 may be a transparent electrode layer, e.g., an ITO layer. As compared with the electronic paper in FIG. 1, no touch electrode layer may be arranged on the first substrate 100 in the embodiments of the present disclosure. A plurality of pixel units and the second electrode layer 201 are arranged in a matrix form on the second substrate 200, and the second electrode layer 201 includes a plurality of electrode blocks 2010. Each pixel unit corresponds to one electrode block 2010, and each electrode unit includes several electrode blocks 2010. As shown in FIG. 4, the plurality of electrode units includes a first electrode unit 501, a second electrode unit 502, a third electrode unit 503 and a fourth electrode unit 504. The electrode blocks 2010 of an identical electrode unit are connected to each other via a metal line 201c. Each electrode unit is connected to a signal line, and connected to the driver IC end through a peripheral signal line. The electrode blocks 2010 of different electrode units are arranged separate from each other.

As shown in FIGS. 1 and 3, in the embodiments of the present disclosure, no touch electrode layer 41 is formed on the first substrate, so it is able to reduce the thickness of the product. On the second substrate, the common electrode at the display region of the electronic paper touch panel is partitioned into a plurality of electrode units arranged separate from each other in accordance with a size of the display region and people's touch habit as well as touch precision. Each electrode unit includes the pixels at an identical amount, and these pixels are arranged in an identical mode. In other words, the arrangement mode of the pixels for each electrode unit is completely the same, and the electrode blocks 2010 of each electrode unit are connected to each other via the metal line 201c. The data lines and the scanning lines on the TFT substrate may be arranged in a manner as shown in FIG. 1. In the embodiments of the present disclosure, the arrangement mode of the metal lines between different electrode blocks may be changed, i.e., the metal line between different electrode units is broken, so as to enable the different electrode units to be disconnected from each other. In addition, each electrode unit is connected to the driver IC end via a separate peripheral signal line. Hence, for the electronic paper touch panel in the embodiments of the present disclosure, a process for forming the touch electrode in FIG. 1 may be omitted, and the display electrode and the touch electrode may be formed simultaneously through a single patterning process on the second substrate, without changing the manufacturing process for the other structures (e.g., the data lines and the scanning lines). As a result, it is able to optimize the pixel design for the electronic paper without any additional manufacture process, i.e., form the self-capacitive touch electrode on the TFT substrate, thereby to provide the thin and light electronic paper touch panel.

The present disclosure further provides in some embodiments a method for controlling the above-mentioned electronic paper touch panel, including steps of: at the touch time period, inputting the touch signal to each electrode unit in the second electrode layer 201; and at the display time period, inputting the display signal to each electrode unit in the second electrode layer 201.

The present disclosure further provides in some embodiments a display device including the above-mentioned electronic paper touch panel.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An electronic paper touch panel, comprising:
   a first substrate where a first electrode layer is formed;
   a second substrate where a second electrode layer is formed; and
   an electronic ink layer arranged between the first electrode layer and the second electrode layer,
   wherein the second electrode layer on the second substrate comprises a plurality of electrode units arranged separate from each other;
   each of the plurality of electrode units is connected to a separate signal line corresponding to the electrode unit;
   the signal line is configured to input a touch signal to the electrode unit at a touch time period, and input a display signal to the electrode unit at a display time period;
   the second substrate comprises a plurality of pixel units, and each electrode unit corresponds to at least one pixel unit; and
   the second electrode layer comprises a plurality of electrode blocks, each of the plurality of electrode blocks corresponds to at least one pixel unit, each electrode unit comprises several electrode blocks, the electrode blocks of an identical electrode unit are connected to each other, and the electrode blocks of different electrode units are arranged independent of each other.

2. The electronic paper touch panel according to claim 1, wherein the pixel units and the electrode blocks are arranged in a one-to-one correspondence manner.

3. The electronic paper touch panel according to claim 1, wherein each electrode unit comprises the electrode blocks at an identical amount.

4. The electronic paper touch panel according to claim 1, wherein the second substrate is an array substrate.

5. The electronic paper touch panel according to claim 1, wherein the first substrate is a polyethylene terephthalate (PET) substrate.

6. The electronic paper touch panel according to claim 1, wherein microcapsules are dispersed within the electronic ink layer.

7. The electronic paper touch panel according to claim 6, wherein each microcapsule includes at least one type of quantum dots for displaying one color.

8. The electronic paper touch panel according to claim 6, wherein the electronic ink layer further comprises a plurality of microcups or spinning balls.

9. The electronic paper touch panel according to claim 1, wherein the first electrode layer is a transparent electrode layer, the second electrode layer is a common electrode layer, and the signal line is configured to input a common electrode signal to each electrode unit at the display time period.

10. A method for controlling the electronic paper touch panel according to claim 1, comprising steps of:
    at a touch time period, inputting a touch signal to each electrode unit in the second electrode layer; and
    at a display time period, inputting a display signal to each electrode unit in the second electrode layer.

11. A touch device, comprising the electronic paper touch panel according to claim 1.

12. The touch device according to claim 11, wherein the second substrate includes a plurality of pixel units, and each electrode unit corresponds to at least one pixel unit.

13. The touch device according to claim 12, wherein the second electrode layer comprises a plurality of electrode blocks, each electrode block corresponds to at least one pixel unit, each electrode unit includes several electrode blocks, the electrode blocks of an identical electrode unit are connected to each other, and the electrode blocks of different electrode units are arranged independent of each other.

14. The touch device according to claim 13, wherein the pixel units and the electrode blocks are arranged in a one-to-one correspondence manner.

15. The touch device according to claim 13, wherein each electrode unit comprises the electrode blocks at an identical amount.

16. The touch device according to claim 11, wherein the second substrate is an array substrate.

17. The touch device according to claim 11, wherein the first substrate is a polyethylene terephthalate (PET) substrate.

18. The touch device according to claim 11, wherein microcapsules are dispersed within the electronic ink layer.

* * * * *